April 6, 1937.   A. BRUNNER   2,076,363
PACKING CUP
Filed March 23, 1935   2 Sheets-Sheet 1

INVENTOR
A. BRUNNER
BY E. E. Huffman
ATTY.

April 6, 1937.    A. BRUNNER    2,076,363
PACKING CUP
Filed March 23, 1935    2 Sheets-Sheet 2

INVENTOR
A. BRUNNER
BY
ATTY.

Patented Apr. 6, 1937

2,076,363

UNITED STATES PATENT OFFICE 2,076,363

PACKING CUP

Albert Brunner, St. Louis, Mo., assignor to Wagner Electric Corporation, St. Louis, Mo., a corporation of Delaware Application March 23, 1935, Serial No. 12,546

4 Claims. (Cl. 309—33)

My invention relates to sealing means for packing elements and particularly to sealing means for packing elements of annular formation which are adapted to surround a portion of a piston and be carried thereby.

In packing elements of the annular type, considerable difficulty has been encountered in preventing leakage of fluid between the piston and the inner surface of the annular packing element which engages the piston. The cause of this leakage arises from several sources, among which are the increasing of the internal diameter of the cup through swelling thereof under the action of heat, and the increasing of the inner diameter of the packing element under the action of the liquid on the material of the packing element.

One of the objects of my invention is to provide means for an annular piston packing element which will seal the piston to the packing element, thereby preventing leakage of fluid between the element and the piston.

Another object of my invention is to produce an improved piston packing element of the annular type in which non-expansible means are combined with the element to prevent it from expanding and thereby drawing away from the piston.

A more specific object of my invention is to produce an efficient annular packing element for use in master cylinders and wheel cylinders of hydraulic braking systems.

Figure 1:
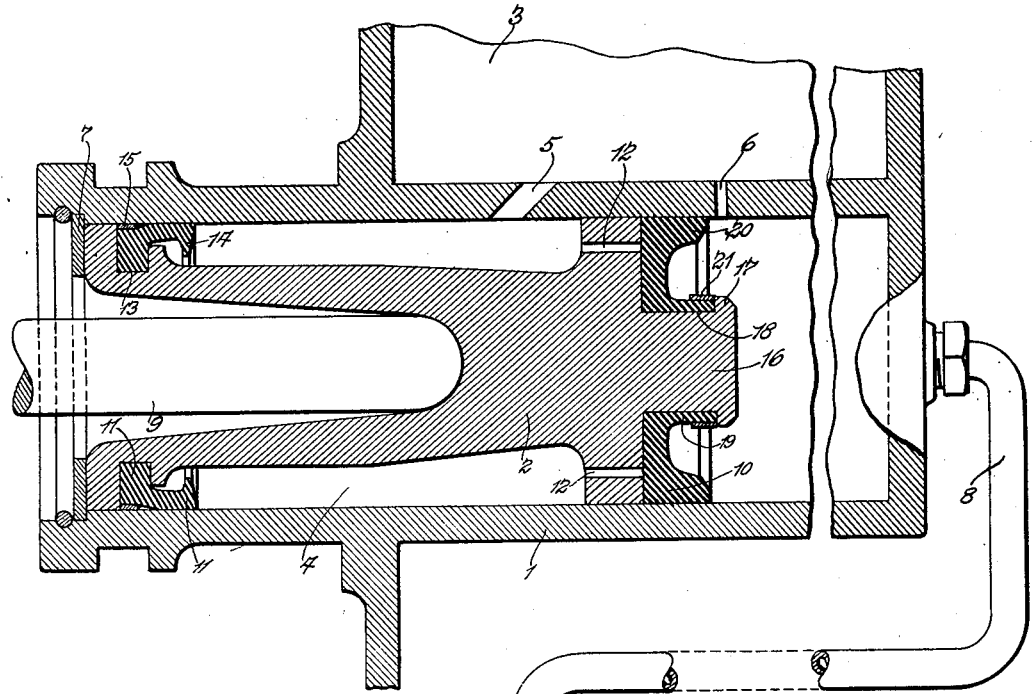
Figure 2:
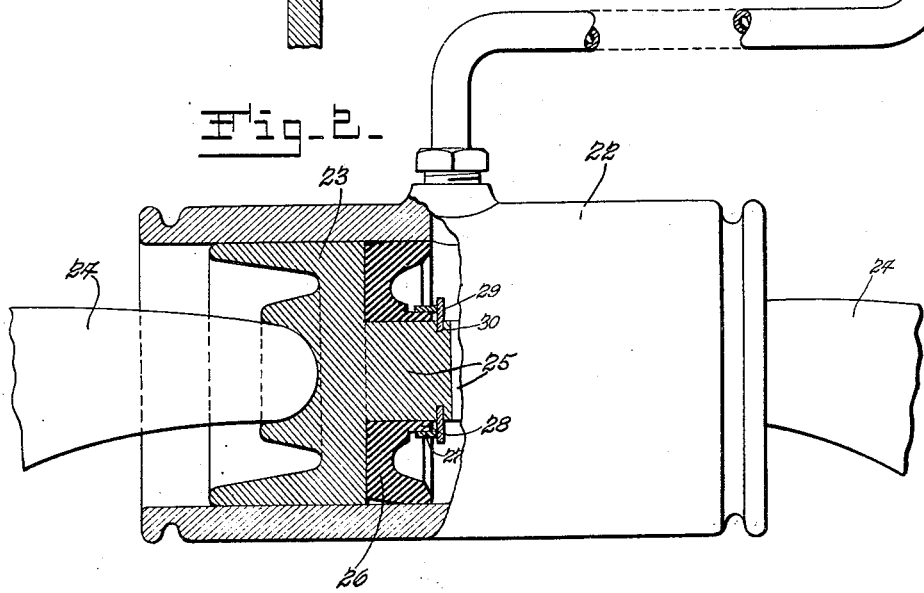
Figure 3:
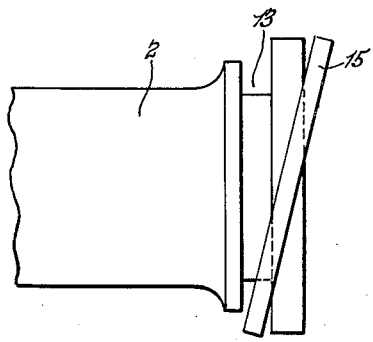
Figure 4:
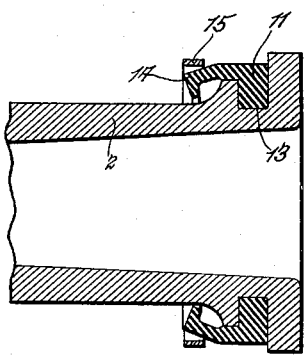
Figure 5:
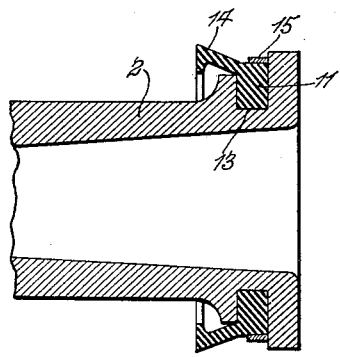
Figure 7:
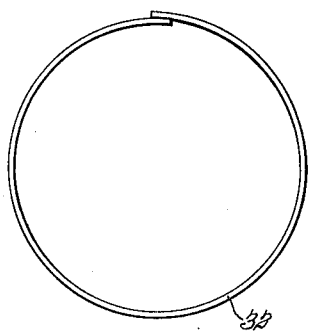
Figure 6:
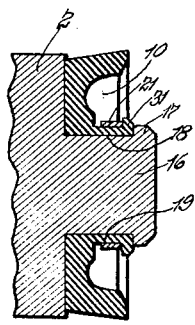

Other objects of my invention will become apparent from the following description taken in connection with the accompanying drawings, showing several embodiments thereof, in which Figure 1 is a cross-sectional view of a master cylinder piston for hydraulic braking systems showing my invention applied to both the primary and secondary packing elements; Figure 2 is a view of a wheel cylinder piston provided with my improved packing element; Figures 3, 4 and 5 are views illustrating how the sealing band is applied; Figure 6 is a cross-sectional view of a modification; and Figure 7 is a view of a modified sealing band.

I have illustrated my invention as being embodied in a hydraulic braking system employing rubber packing elements but it will be understood that it may be used with packing elements employed in other apparatus and composed of other material.

Referring in detail to Figure 1 of the drawings, there is shown a compressor for a hydraulic braking system, this compressor comprising a cylinder 1, a piston 2 adapted for reciprocation therein, and a reservoir 3 positioned above the cylinder. The piston 2 is of the double piston type provided at each end with portions of substantially the same diameter and of slightly less diameter than the cylinder. The annular recess 4 between the end portions of the piston, forms, with the cylinder, an annular liquid containing chamber which chamber is in constant communication with the reservoir by means of passage 5. The portion of the cylinder ahead of the piston is in communication with the reservoir by means of passage 6 when the piston is in its fully retracted position against the piston stop 7. The cylinder ahead of the piston is also provided with an outlet conduit 8 for communication with the wheel cylinders of the system for applying the brakes. Such wheel cylinder is shown in Figure 2 and will be later described. The piston 2 is actuated by the usual piston rod 9.

In order to prevent leakage of fluid past the head of the piston during the protractile movement of the piston, the piston is provided with a packing element or cup 10 which is shown as embodying my invention. Also, since the piston 2 is provided with an annular fluid containing recess, the rear of the piston must also be provided with a packing element 11 to prevent leakage of liquid to the exterior. This element 11, which is commonly known as the secondary packing cup, also embodies my invention.

The head of the piston has extending therethrough a plurality of passage ways 12 which permit liquid to pass from the annular chamber 4 and past the periphery of the packing cup 10 to the portion of the cylinder ahead of the piston during retractile movement of the piston, thus insuring that no partial vacuum will be present ahead of the piston and, therefore, cause air to be drawn into the system.

The above described master cylinder device is of well known construction and further description of its operation appears to be unnecessary.

The rear of the piston 2 has formed therein an annular groove 13 into which fits the annular ring portion of the secondary packing cup 11. This packing cup also has formed thereon, a lip portion 14 which is adapted to engage the cylinder wall, thus preventing liquid from escaping between the packing and the cylinder wall. The lip of the cup is normally larger than the normal diameter of the cylinder, as shown in Figure 5, and, therefore, engages the cylinder wall with a slight pressure. The packing cup is made of a suitable rubber composition and is both yieldable and flexible.

It has been found that the cup has a tendency to swell under the action of heat, which swelling tends to cause the inner diameter of the cup to expand and thereby withdraw slightly from the base of the groove 13, thus permitting fluid to pass between the packing cup and the piston. The influence of fluid in contact with the cup material also acts on the rubber, causing some expansion and a slight increase in the inner diameter of the cup.

In accordance with my invention I have discovered that the packing cup may be effectively sealed to the base of the piston groove surrounding the packing cup with a very thin unsplit non-expansible band 15 of suitable material, as for example, brass, tin, aluminum, steel, copper or alloys thereof. The width and thickness of the band may be varied to suit many sizes of cups. In practice I have found that for the specific packing cup disclosed, and when using brass material, a band 1/64 of an inch in thickness and approximately $\frac{3}{32}$ of an inch in width, is satisfactory. The band is formed with an external diameter not greater than the external diameter of the rear end of the piston which is also slightly less than the diameter of the cylinder and thus little or no rubbing contact will take place between the band and the cylinder wall. The internal diameter of the band is substantially the same as the normal external diameter of the packing cup so that it fits snugly against the outer periphery of the packing cup and lies opposite the base of the piston groove. The band applies very little pressure to the outer surface of the packing cup and because of its non-expansibleness, the packing cup is confined between it and the walls forming the groove and therefore the tendency of the cup to expand and withdraw from the base of the groove is prevented and an effective seal created between the packing cup and the piston.

The method I employ in assembling the unsplit band and the packing cup 11 on the rear of the piston, is disclosed in Figures 3, 4 and 5. Since the rear of the piston is of a diameter slightly greater than the internal diameter of the band, the band cannot be slipped directly into position and, therefore, a special method of assembly is necessary. In the preferred method the band is first placed on the piston, which is accomplished by holding the band at an angle to the axis of the piston and simultaneously deforming it to form an ellipse having a major diameter greater than the diameter of the piston end. This will permit the band to be slipped over the end of the piston if one portion of the band is first dropped over one side of the end of the piston and then the opposite side of the band slipped over the opposite side of the end of the piston. Figure 3 shows the band partially slipped over the end of the piston. After the band is on the piston, it is pushed back out of the way and the rubber packing cup is then placed in position in groove 13 by stretching it over the end of the piston in a manner similar to the way in which the band was slipped over the end of the piston. After the cup has been placed in the proper position, the lip of the cup is contracted, as shown in Figure 4. The band is then slipped past the lip of the cup into its final position against the end of the piston and surrounding cup. The end of the piston and the lip of the cup provide means for retaining the band in its proper position. The final position of the cup and the band prior to the positioning of the piston in the cylinder is shown in Figure 5.

In cases where the end of the piston is of a diameter only slightly larger than the internal diameter of the band, the packing cup 11 may be positioned in the groove 13 first, and then the band slipped over the end of the piston in the manner above described and positioned directly on the packing.

In master cylinder devices where it is desired to eliminate the usual piston retracting spring interposed between the end of the cylinder and the piston head, it has been found that an annular packing cup is very effective in maintaining the packing cup against the head of the piston. In Figure 1 I have shown the piston head packing cup as being of the annular type which permits the retracting spring to be eliminated. The head of the piston is provided with a central projection 16 having a flange 17 at its outer end to thereby form, with the piston head, a groove 18. The annular packing cup 10 previously referred to, is provided with an inner annular flange 19 which is adapted to lie in the groove 18. The lip 20 of the cup 10 engages the cylinder wall and is normally maintained in engagement therewith when the piston is actuated by the fluid under pressure. The fluid under pressure, however, is not always effective in maintaining a perfect seal between the packing cup and the projection 16. In order to insure that there is an efficient seal at this point I provide an unsplit band 21 around the flange portion 19 which is in engagement with the projection. This band 21 is non-expansible and flexible in the same manner as band 15 previously described with respect to the packing cup 11. The band is adapted to snugly engage the flange 19 of the cup to prevent its disengagement from the surface of the projection as a result of swelling and so forth. The flange 17 on the end of the piston projection 16 insures that the packing cup and the band will be maintained in proper position. In assembling the packing cup 10 and the band 21 on the head of the piston, the packing cup is stretched and slipped over the flange 17 and the band is slipped over the flange in the same manner that the band 15 is slipped over the end of the piston.

The type of annular cup employed on the head of the piston may be equally well employed in fluid motors which are adapted to expand the brake shoes into engagement with the brake drum. In Figure 2 I have shown a slightly modified form of construction for use with a wheel cylinder piston. The wheel cylinder 22 is connected to the outlet conduit 8 of the master cylinder and has mounted therein two oppositely movable pistons 23 (one only being shown) adapted to engage and operate the ends 24 of a pair of brake shoes. Piston 23 is provided with a central projection 25 upon which is mounted an annular packing cup 26. This annular packing cup is similar to the packing cup 10 carried by the head of the piston. An unsplit sealing band 27 surrounds and engages the inner flange 28 of the packing cup. The cup 26 and the band 27 are maintained in position upon the piston projection by a split spring washer 29 which engages in an annular groove 30 at the end of the piston. In this construction it is not necessary to slip the band 27 over a retaining flange and, therefore, the band may be of more rigid construction than the bands 15 and 21 if desired.

In assembling the structure of Figure 2, the packing cup is first slipped on the piston projection, the band 27 slipped over the flange 28 of the packing cup, and the split spring washer snapped into groove 30. When the annular type of packing cup is used on wheel cylinder pistons, the packing cups are effectively carried by the pistons and, therefore, the necessity of having a coil spring interposed between the opposed packing cups to maintain them in engagement with the heads of the pistons, is eliminated. The annular packing cup and the means for holding it on the piston projections may be varied as desired.

In Figure 6 I have shown a slightly modified form of packing cup for use with a piston projection, such as 16, previously described. In this construction the inner flange 19 of the packing cup 10 has formed thereon an inwardly extending flange 31 adapted to engage the flange 17 on the piston projection 16. The band 21 is positioned between flange 31 and the main body of the packing cup.

In all of the packing cups described, the sealing bands are of unsplit construction but if desired, the band may be made from a single strip of material and placed in position on the packing cup by wrapping it about the surface of the cup, and then connecting the overlapping ends of the strip together.

In Figure 7 I have shown a band 32 made from a single flexible strip with the over-lapping ends tinned or soldered together by the application of a hot point. Other ways of connecting these ends may be employed.

Having fully described my invention, what I claim as new and desire to secure by Letters Patent of the United States is:

1. In liquid pressure apparatus of the class described, a cylinder, a piston reciprocable therein and having a flange thereon and a head portion spaced from the flange and of a diameter not less than that of the flange, an annular rubber packing element surrounding and contacting a portion of the piston adjacent the flange and being held in position thereby, said packing element being subject to expansion under the action of heat and of the liquid in contact therewith which tends to cause an increase in its internal diameter, and a distortable unsplit non-expansible band surrounding and engaging a portion of the packing element opposite the portion that contacts the piston to thereby prevent increase in the internal diameter of the packing element, said band being of smaller internal diameter than the external diameter of the flange of the piston but not of sufficiently smaller diameter that it cannot be passed thereover by distorting the band into the form of an ellipse, the major axis of which is greater than the diameter of the flange of the piston.

2. In liquid pressure apparatus, a cylinder, a piston therein having an annular liquid containing recess intermediate its ends and said ends being substantially the same diameter as the cylinder, means forming an annular groove adjacent one end of the piston, an annular yieldable and flexible packing element engaging the base of said groove and provided with a forwardly extending lip portion having a normal diameter greater than the cylinder diameter and engaging the cylinder wall, said packing element being subject to expansion under the action of heat and of the liquid in contact therewith which tends to cause an increase in its internal diameter, and a distortable unsplit non-expansible band surrounding and engaging said annular packing element opposite the piston groove to prevent increase in the internal diameter of the packing element, said band being of smaller diameter than the diameter of the end portion of the piston but not of sufficiently smaller diameter that it cannot be passed thereover by distorting the band into the form of an ellipse, the major axis of which is greater than the diameter of the piston end portion.

3. In a hydraulic master cylinder device, a cylinder, a piston therein having a head portion and a flange spaced therefrom, said head portion being of at least as large a diameter as the flange, means forming an annular groove in one end of the piston adjacent the flange, the side walls of said groove being at right angles to the axis of the piston, an annular yieldable and flexible packing element having a body portion of rectangular cross section lying within the groove and engaging the base thereof and an integral portion extending over the forward wall of the groove and engaging the cylinder wall, and an unsplit non-expansible band surrounding and engaging the body portion of the annular packing element, the flange forming the rear wall of said groove being of greater diameter than the internal diameter of the band and the forward wall of said groove being of such diameter that the lip may be sufficiently flexed radially inwardly to permit the band to be passed over the lip.

4. In fluid pressure apparatus of the class described, a cylinder, a piston reciprocable therein and having a head portion at one end and a peripheral groove adjacent the other end thereof, the rear wall of the groove being formed by a piston guide flange cooperating with the cylinder wall, said piston head having a diameter at least as great as that of the flange, an annular rubber packing element having a portion fitting in said groove and in liquid sealing relation therewith and a sealing lip extending forwardly of said groove and contacting with the cylinder wall, a thin unsplit non-expansible ring surrounding the part of the packing element aligned with the groove, said portion of said element adjacent the piston guide flange having a normal external diameter only slightly less than the diameter of the flange, said ring functioning in association with the walls of said groove to so confine the portions of the packing element that expansion of said element under the influence of heat and of operating fluid in contact therewith increases rather than diminishes the sealing pressure between the surface of the packing element and the walls of the groove, said ring having an external diameter not greater than the diameter of the piston flange and an internal diameter slightly less than the external diameter of the flange but large enough to permit the ring to be passed over the flange by distorting the ring into the form of an ellipse.

ALBERT BRUNNER.